United States Patent [19]
Howley et al.

[11] Patent Number: 5,241,173
[45] Date of Patent: Aug. 31, 1993

[54] READHEAD FOR PRODUCING SIGNALS WHEN TRAVELLING ALONG A SCALE HAVING A SET-UP DETECTOR FOR DETECTING ALIGNMENT OF QUADRATURE SIGNALS

[75] Inventors: Colin K. Howley, Stonehouse; James R. Henshaw, Stroud, both of United Kingdom

[73] Assignee: Renishaw Transducer Systems Limited, Gloucestershire, United Kingdom

[21] Appl. No.: 881,086

[22] Filed: May 11, 1992

[30] Foreign Application Priority Data

May 16, 1991 [GB] United Kingdom ............... 9110598

[51] Int. Cl.$^5$ ............................................. G01D 5/34
[52] U.S. Cl. ........................... 250/231.16; 250/237 G; 324/207.22; 324/76.78
[58] Field of Search ............... 250/237 G, 231.16; 324/83 Q, 207.22

[56] References Cited

U.S. PATENT DOCUMENTS

| | | | |
|---|---|---|---|
| 4,459,583 | 7/1984 | van der Walt et al. | 340/589 |
| 4,949,289 | 8/1990 | Stephens et al. | 364/577 |
| 4,959,542 | 9/1990 | Stephens | 250/237 G |
| 5,128,609 | 7/1992 | Howley | 324/83 Q |

FOREIGN PATENT DOCUMENTS

| | | |
|---|---|---|
| 303008 | 2/1989 | European Pat. Off. . |
| 3829815 | 3/1990 | Fed. Rep. of Germany . |
| WO90/02956 | 3/1990 | PCT Int'l Appl. . |

OTHER PUBLICATIONS

Patent Abstracts of Japan; vol. 013, No. 239 (P-879) 6 Jun. 1989 & JP-A-01 042 797 (Fuji Electric Co Ltd) 15 Feb. 1989, Abstract.

*Primary Examiner*—David C. Nelms
*Assistant Examiner*—T. Davenport
*Attorney, Agent, or Firm*—Spencer, Frank & Schneider

[57] ABSTRACT

A readhead 10 traverses along a scale 12, producing square wave signals in quadrature on lines 24,26. These are counted by an external counter 28 to indicate the position along the scale. The square waves cannot be used to monitor the orientation and stand-off of the readhead 10 relative to the scale 12. To achieve this, therefore, circuitry within the readhead 10 monitors the sinusoidal quadrature signals from which the square waves are produced, and gives a simple go/no-go indication on a LED 62 when these signals have an acceptable amplitude and are in an acceptable quadrature relationship.

17 Claims, 2 Drawing Sheets

READHEAD FOR PRODUCING SIGNALS WHEN TRAVELLING ALONG A SCALE HAVING A SET-UP DETECTOR FOR DETECTING ALIGNMENT OF QUADRATURE SIGNALS

FIELD OF THE INVENTION

This invention relates to apparatus for assisting in the setting up of devices which produce output signals in quadrature. Such apparatus is useful in setting up a scale and readhead, such as used on coordinate measuring machines or machine tools, to determine the position of a movable part of such a machine relative to a fixed part.

DESCRIPTION OF PRIOR ART

It is well known to provide such scales and readheads wherein the readhead has two sinusoidal outputs in quadrature. These outputs can be fed to further circuitry for counting the cycles of the quadrature output signals so as to determine position. The further circuitry may also determine the direction of movement by determining which of the quadrature signals leads the other, and/or provide position interpolation within one cycle of the output. Of course, for good results it is desirable that the readhead should be set-up correctly aligned relative to the scale, for example at an appropriate stand-off distance from the scale to achieve good signal levels.

Our earlier International Patent Specification No. WO90/02956 describes set-up equipment for such purposes. In practice, such equipment is provided externally of the readhead, and receives the two sinusoidal quadrature outputs of the readhead.

However, there is a need for readheads which provide quadrature outputs which are not sinusoidal, but square waves. This may be achieved by including zero crossing detectors within the readhead, to square up the sinusoidal signals before they are output from the readhead. However, there is then a problem, because the external set-up equipment described in WO90/02956 will not work with such square wave output signals.

SUMMARY OF THE INVENTION

One aspect of the present invention, in broad outline, provides a readhead which contains integrally a circuit for detecting signal levels indicative of the proper set-up of the readhead. The readhead may comprise sensing means for detecting marks on a scale and producing quadrature signals in response thereto; said circuit then acting on the output of the sensing means to produce an indication of proper set-up of the readhead relative to the scale. The quadrature outputs of the sensing means may also be fed to squaring means for providing square wave quadrature outputs from the readhead.

Whilst it is preferred that said circuit is provided within the readhead, this is not essential and some embodiments of the invention provide such a circuit externally.

In one preferred form, the invention provides a readhead including sensing means for sensing marks on a scale and for producing quadrature signals therefrom, and set-up detector means (internally or externally of the readhead), said detector means comprising:

a first comparator acting on a first one of the quadrature signals, for comparing the first quadrature signal to a threshold below which the signal is useable but not optimum, and for providing an output if the first quadrature signal is below said threshold;

a second comparator acting on a second one of the quadrature signals, for comparing the second quadrature signal to a threshold below which the signal is useable but not optimum, and for providing an output if the second quadrature signal is below said threshold; and means connected to the outputs of the two comparators for providing an indication if both quadrature outputs are below said thresholds simultaneously.

BRIEF DESCRIPTION OF THE DRAWINGS

Preferred embodiments of the present invention will now be described by way of example, with reference to the accompanying drawings, wherein.

DESCRIPTION OF PREFERRED EMBODIMENTS

Figure 1:
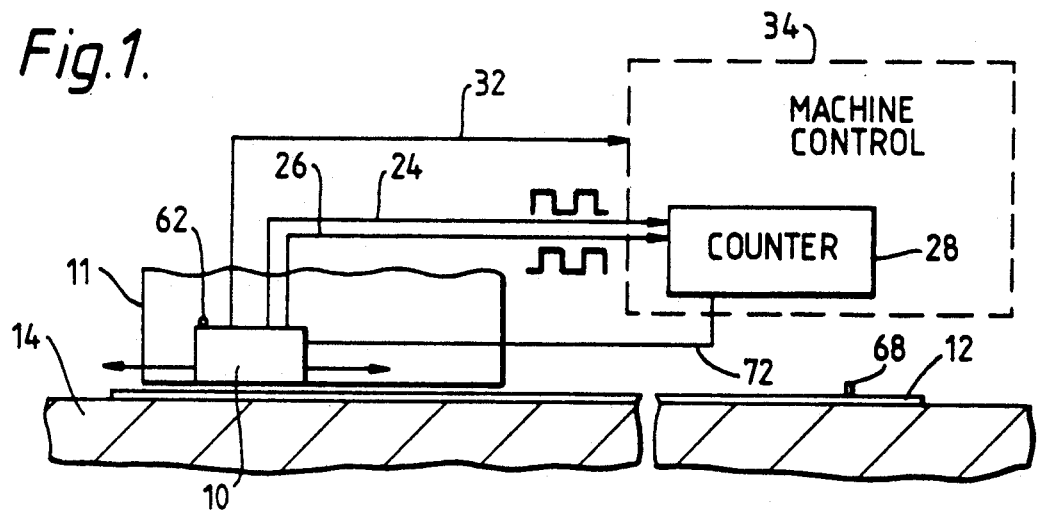
FIG. 1 is a schematic representation of a scale and readhead mounted on a machine.

FIG. 1 shows a readhead having a housing 10 affixed to a relatively movable part 11 of (for example) a machine tool or coordinate measuring machine (CMM). The readhead housing 10 is traversable along a scale 12, as indicated by arrows in the Figure. The scale 12 is mounted to a relatively fixed part 14 of the machine tool or coordinate measuring machine. The scale 12 has periodic marks spaced along its length, e.g. at intervals of 20 $\mu$m, and the readhead housing 10 contains a sensor 15 (FIG. 2) for detecting the scale marks as they pass the readhead, and producing two sinusoidal output signals in quadrature (sine and cosine) as the readhead is moved. Such sensors are well known, and may for example be as described in U.S. Pat. Nos. 4,959,542 and 4,949,289.

Figure 2:
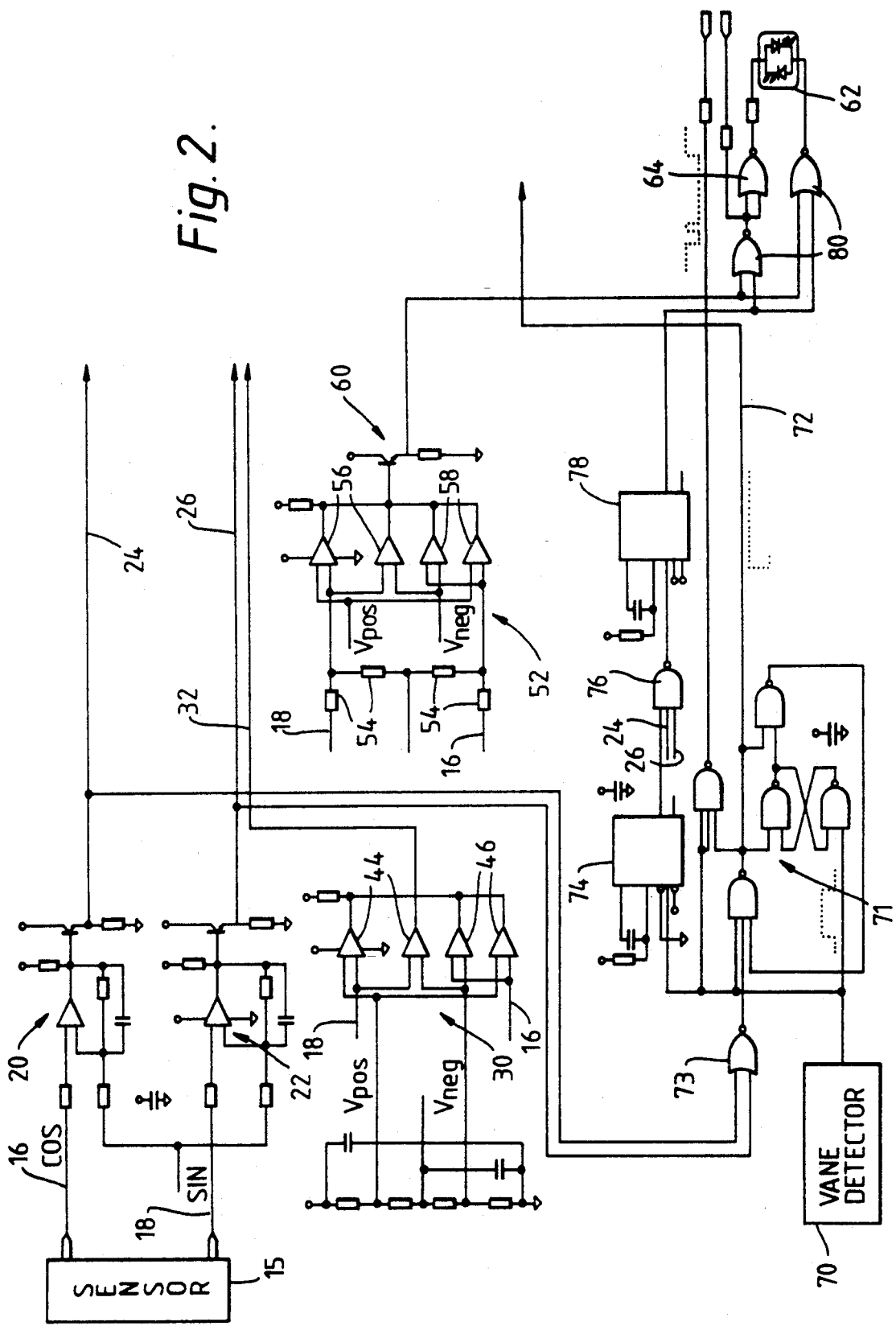
FIG. 2 is a circuit diagram of circuitry contained within the readhead of FIG. 1.

FIG. 2 shows lines 16,18 which carry the two sinusoidal outputs in quadrature from the sensor 15 to respective squaring circuits 20,22 within the readhead 10. These circuits are conventional, and contain zero crossing detectors so as to produce square wave outputs on respective lines 24,26, in quadrature. These outputs form the main outputs of the readhead 10 and as shown in FIG. 1 are taken to an external counter 28. The counter 28 is entirely conventional and is contained in the control 34 of the machine tool or CMM. It counts the number of cycles of the square waves on the lines 24,26, providing an output accordingly which indicates the distance travelled along the scale 12 by the readhead 10. It also detects the direction of the movement of the readhead, from the relative phases of the square waves, in order to determine whether to count upwards or downwards.

The fact that the readhead 10 produces quadrature square waves on the lines 24,26 means that if desired it is easy to retrofit such a readhead to the control 34 of an existing machine which expects square wave inputs. The use of essentially digital signals on the lines 24,26 also ensures that the interconnecting wiring can be installed easily and cheaply, since such signals have good noise immunity.

Figure 3:
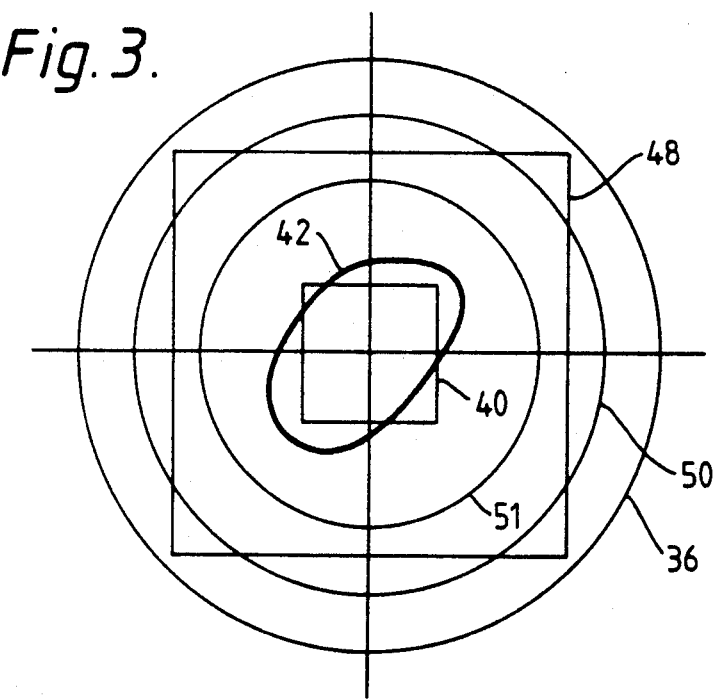
FIG. 3 is a Lissajous diagram for use in explaining the operation of the circuit of FIG. 2.

FIG. 2 also shows an error detection circuit 30, which provides an error signal on a line 32 from the readhead 10 to the machine control 34 if the sine and cosine signals on the lines 16,18 are at such a low level, in normal operation of the readhead, as to be unreliable or unusable. The circumstances in which this error signal is provided can be understood from consideration of FIG. 3, which shows the circular Lissajous FIG. 36 which would be obtained if the sine and cosine signals on lines 16,18 were fed to the x and y inputs respectively of an oscilloscope. It will be understood that this hypothetical Lissajous figure 36 will only be a perfect circle as shown, if the alignment of the readhead 10 with respect to the scale 12 is correct. Furthermore, if the stand-off of the readhead from the scale is not correctly set-up, the radius of the Lissajous FIG. 36 will be smaller than shown. The effect of the error detector circuit 30 is to define an error zone 40, which is represented as a small square on the Lissajous diagram of FIG. 3. Should the hypothetical Lissajous figure produced by the signals on the lines 16,18 fall wholly or partially within this error zone 40, for example as shown by the line 42, an error signal is generated on the line 32 to cause the machine control 34 to cease operation and/or activate an alarm. The collapse in the Lissajous figure as shown at 42 may be caused by the readhead becoming misaligned, or by its stand-off from the scale becoming misadjusted.

The error detector circuit 30 comprises two window comparators. The first window comparator comprises two threshold comparators 44, which respectively compare the sine signal on the line 18 with positive and negative threshold reference voltages $V_{pos}$ and $V_{neg}$, which correspond to two opposing sides of the square 40. Likewise, the second window comparator comprises two threshold comparators 46, which respectively compare the cosine signal on the line 16 with the same threshold references $V_{pos}$ and $V_{neg}$, corresponding to the other two sides of the square 40. The outputs of the four comparators 44,46 are connected together in a wired-OR configuration, to give the error signal on the line 32. The configuration is such that the signal on line 32 is only high if the sine signal on line 18 lies within the small range between the values $V_{pos}$ and $V_{neg}$, while simultaneously the cosine signal on line 16 also lies within this same range between $V_{pos}$ and $V_{neg}$. This corresponds to the instants at which the line 42 in FIG. 3 lies within the square 40. At all times when the readhead is functioning satisfactorily, the hypothetical Lissajous figure will lie outside the small square 40, and there will be no error signal on line 32.

However, the error detection circuit 30 is only useful for detecting errors in the normal operation of the device, for which relatively small thresholds are required, corresponding to a relatively small error zone 40. Such a circuit is of little use for the initial setting up of the readhead with respect to the scale. This is because if the readhead 10 is set-up such that the Lissajous figure just falls outside the square error zone 40, then it cannot be assured that the sine and cosine signals on the lines 16,18, will have the desired large optimum values and will not drift very quickly back within the error zone 40 in use.

To overcome these problems, the readhead includes a set-up circuit 52. This contains two further window comparators which also receive the incoming sine and cosine signals from the lines 16,18. However, unlike the error detector 30, the circuit 52 includes resistive dividers 54, to divide the incoming sine and cosine signals by a value of about three in this specific example. (N.B. In general this value may vary depending upon: power supplies; dynamic range of signals (error zone); definition of acceptable signal size). The first of these window comparators comprises threshold comparators 56, which compare the sine signal (divided by three) with the positive and negative references $V_{pos}$ and $V_{neg}$ respectively. The second window comparator comprises threshold comparators 58 which compare the cosine signal on the line 16 (divided by three) with the threshold references $V_{pos}$ and $V_{neg}$ respectively. The outputs of the comparators 56,58 are in a wired-OR configuration, like those of the error detector 30, and the effect is therefore to provide a high output from the circuit 52 only if both the sine signal and the cosine signal fall within a zone defined by a square 48 in FIG. 3. Because of the division by three, this square is three times the size of the error zone 40. It will be appreciated that the same result can be achieved by using reference threshold voltages which are three times the size of the thresholds $V_{pos}$ and $V_{neg}$.

The combined output of the window comparators 56,58 is fed via a buffer 60 to a visual indicator, in the form of a bicolour light emitting diode (LED) 62, provided on the housing of the readhead. The LED 62 emits red light if biased in one direction, and green light if biased in the opposite direction. Both terminals of the LED 62 are driven from the output of the buffer 60, one of them via an inverter 64. The result is that the LED 62 emits green light while the hypothetical Lissajous FIG. 36 remains outside the square 48, and red light while the Lissajous lies within that square.

The setting up operation is then quite easy. The person installing the readhead 10 simply traverses the readhead along the scale, observing the LED 62 which is provided on the readhead. Initially, it will probably emit purely red light, indicating that the hypothetical Lissajous lies entirely within the square 48 as indicated by the circle 51 in FIG. 3. The alignment and stand-off of the readhead are adjusted, and the traversal of the readhead along the scale repeated. As the set-up improves, the observed colour of the LED will become yellow instead of red, indicating that the LED is emitting red light for part of the time and green light for the remainder of the time. This corresponds to, for example, the Lissajous FIG. 50 in FIG. 3. Further adjustment of the set-up of the readhead relative to the scale will result in completely green light being emitted from the LED, denoting that the Lissajous figure now lies entirely outside the square 48, as indicated at 36 in FIG. 3, and the set-up is therefore satisfactory.

It is also possible to directly monitor the LED with a meter, and adjust the alignment and stand-off in accordance with the meter readings. The meter could be set up to represent the LED output as follows:

| LED SIGNAL | METER READING |
| --- | --- |
| Green | Full-scale deflection |
| Yellow | Mid-range deflection |
| Red | No deflection |

This may be useful if, for some reason, it is not possible to easily observe the LED.

If the set-up should drift in time, as the scale and readhead are used over an extended period, this will result in the Lissajous figure falling partially within the square 48 once again, and the LED 62 will again emit yellow light instead of green. This effect will be observed well before the set-up gives problems, that is, well before the Lissajous figure falls within the error zone 40. The most likely cause of such an effect is that the scale 12 has become dirty in use, lowering the amplitude of the sine and cosine signals on lines 16 and 18. Thus, monitoring the colour of the LED 62 provides the user of the machine with an early warning that maintenance is required such as cleaning the scale, before any actual problems occur which would be indicated by an error signal on the line 32.

As shown in FIG. 2, the set-up zone lies within the square 48. This has the advantage that simple window comparators can be used to define the edges of the square. However, it is possible for the set-up zone to be defined by other shapes in FIG. 2, e.g. by a circle having a radius between those of the circles 50 and 36. This has the advantage of giving a faster, cleaner transition from the set-up zone to the acceptable area outside this circle. However, the electronics are then more complex, e.g. involving the use of multipliers.

The scale 12 may be provided with an upstanding vane 68 alongside it at one location along its length. This indicates a zero or reference position, and the readhead 10 contains a vane detector 70 which detects the passing of the vane. A circuit 71 processes the output of the vane detector 70 and provides a reference marker pulse on a line 72 to the counter 28. Thus, the counter 28 can be reset to zero (or preset to a known value) in the event that it loses its count, e.g. because of a power failure. This marker pulse is provided, not when the leading edge of the vane 68 passes the detector 70, but rather when next the sine and cosine signals are both "high", i.e. when lines 24,26 are both low, since this gives greater stability and precision. To achieve this, a NOR-gate 73 provides an output when both lines 24,26 are low, and this is gated with the output of the vane detector 70 in the circuit 71 to form the marker pulse.

The vane 68 is adjustably mounted. It is desirable to set it up so that its leading edge does not occur close to that leading edge of the square waves upon which both the lines 24,26 become low. This helps prevent the possibility that the marker pulse might be triggered on a leading edge of an adjacent cycle of the square waves, rather than the intended cycle, in the event of any slight drifting of the position of the vane 68. The desired set-up for the vane, therefore, is such that its leading edge occurs while both lines 24,26 are high.

Setting up the vane 68 in this manner is made easy by the following additional circuitry. A monostable 74 is triggered by the passing of the leading edge of the vane, giving a narrow pulse. This is gated in a NAND-gate 76 with the squared up quadrature signals on lines 24 and 26, to ensure that the leading edge of the vane has occurred when both signals are high. When this condition exists a further monostable 78 provides a longer output pulse. This is gated with the output of the buffer 60, in gates 80, so as to cause the LED 62 to give a red flash as the vane passes, indicating correct setting up of the vane position.

Figure 4:
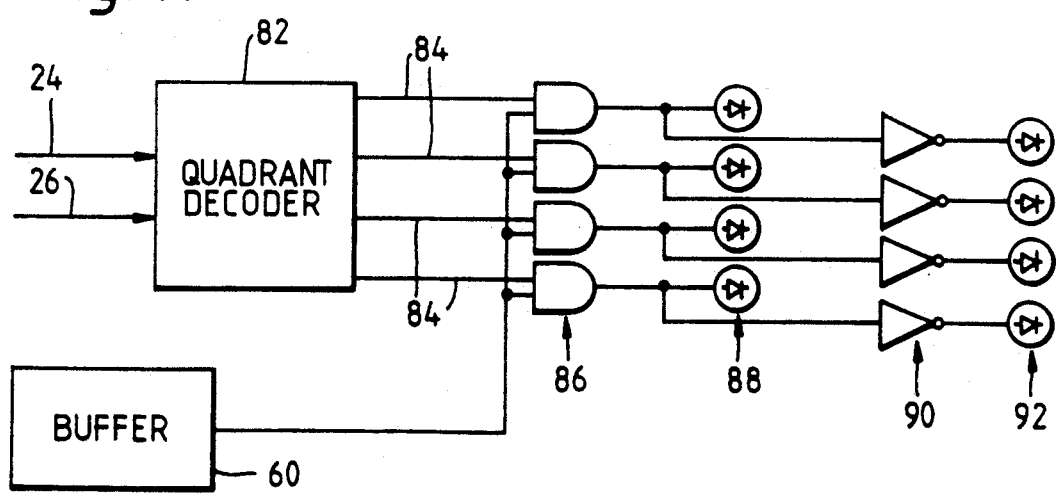
FIG. 4 is a circuit-diagram of a modification of FIG. 2.

FIG. 4 shows a modification to the circuit of FIG. 2, which is most useful if it is decided to provide the set-up circuit externally of the readhead housing 10, where there is more room for circuitry and indicators. It can, however, be provided within the readhead housing 10 if desired. In this modification, the square wave quadrature outputs on lines 24,26 are taken to a quadrant decoder circuit 82. This contains simple gating to determine which of the four quadrants of the Lissajous diagram of FIG. 3 the signal occupies at any instant of time, and to turn high a respective one of four output lines 84. These are used to gate the output of the buffer 60 of FIG. 2, in four respective gates 86. Obviously, each one of these gates is enabled in turn, as the quadrature signals pass through a cycle. If the output of the buffer 60 is high in any given quadrant, indicating an unsatisfactory signal level a corresponding one of four red LEDs 88 is illuminated. If it is low, a corresponding green LED 92 is illuminated via an inverter 90. Setting up the readhead involves the same procedure as previously, except that now the object is to ensure that all the green LEDs 92 are illuminated and all the red LEDs 88 are extinguished. Since the user is now provided with information as to which quadrant or quadrants of the Lissajous are giving problems, for example if the Lissajous is elliptical instead circular, this provides the user with more information to assist in adjusting not only the stand-off of the readhead from the scale, but also its alignment.

Of course, the invention is of use not only for readheads for reading linear scales, as described above but also for readheads reading rotary scales such as found in angle encoders.

We claim:

1. A readhead for producing signals when traversed along a scale, comprising a housing; sensing means within the housing for sensing marks on said scale and producing signals in quadrature in response thereto; outputs for sending external signals from the housing in accordance with said quadrature signals; set-up detector means within the housing, before said outputs, for detecting levels of said quadrature signals indicative of proper set-up of the readhead, the set-up detector means differentiating whether said signal levels are above or below given levels; and indicator means on the housing for receiving an output from the set-up detector means and providing an indication accordingly.

2. A readhead according to claim 1, in which the set-up detector means comprises:

a first comparator acting on a first one of the quadrature signals, for comparing the first quadrature signal to a threshold is useable but not and for providing an output if the first quadrature signal is below said threshold;

a second comparator acting on a second one of the quadrature signals, for comparing the second quadrature signal to a threshold and for providing an output if the second quadrature signal is below said threshold; and means connected to the outputs of the two comparators for providing an indication if both quadrature outputs are below said thresholds simultaneously.

3. A readhead according to claim 1, including squaring means for receiving the quadrature signals from the sensing means and providing square wave quadrature signals as said external signals from said outputs from the housing.

4. A readhead according to claim 1, wherein the set-up detector means includes a visual indicator for providing said indication.

5. A readhead according to claim 4, wherein the visual indicator changes colour to provide said indication.

6. A readhead according to claim 1, including error detector means for detecting levels of said quadrature signals indicative for unreliable operation of the readhead, the levels detected by the error detector means being lower than the levels detected by the set-up detector means.

7. A readhead according to claim 1, including means for indicating the quadrant of a Lissajous figure corresponding to said quadrature signals in which the level of the quadrature signals has fallen below said given level.

8. A readhead according to claim 1, including means for detecting the passing of a zero or reference position on the scale.

9. A readhead according to claim 8, including means for indicating whether said passing of a zero or reference position occurs in a desired part of the cycle of the quadrature signals.

10. A readhead for producing signals when traversed along a scale, including sensing means for sensing marks on said scale and producing signals in quadrature in response thereto; and set-up detector means which comprises:

a first comparator acting on a first one of the quadrature signals, for comparing the first quadrature signal to a threshold and for providing an output if the first quadrature signal is below said threshold;

a second comparator acting on a second one of the quadrature signals, for comparing the second quadrature signal to a threshold and for providing an output if the second quadrature signal is below said threshold; and means connected to the outputs of the two comparators for providing an indication if both quadrature outputs are below said thresholds simultaneously.

11. A readhead according to claim 10, including squaring means for receiving the quadrature signals from the sensing means and providing square wave quadrature outputs from the readhead.

12. A readhead according to claim 10, wherein the set-up detector means includes a visual indicator for providing said indication.

13. A readhead according to claim 12, wherein the visual indicator changes colour to provide said indication.

14. A readhead according to claim 10, including error detector means for detecting levels of said quadrature signals indicative of unreliable operation of the readhead, the levels detected by the error detector means being lower than the levels detected by the set-up detector means.

15. A readhead according to claim 10, including means for indicating the quadrant of a Lissajous figure corresponding to said quadrature signals in which the level of the quadrature signals has fallen below the level which is useable but not optimum.

16. A readhead according to claim 10, including means for detecting the passing of a zero or reference position on the scale.

17. A readhead according to claim 16, including means for indicting whether said passing of a zero or reference position occurs in a desired part of the cycle of the quadrature signals.

* * * * *